June 14, 1927.
C. W. STEELE
1,632,151
STRIP APPLYING ATTACHMENT FOR TIRE BUILDING MACHINES
Filed Sept. 14, 1926    2 Sheets-Sheet 1
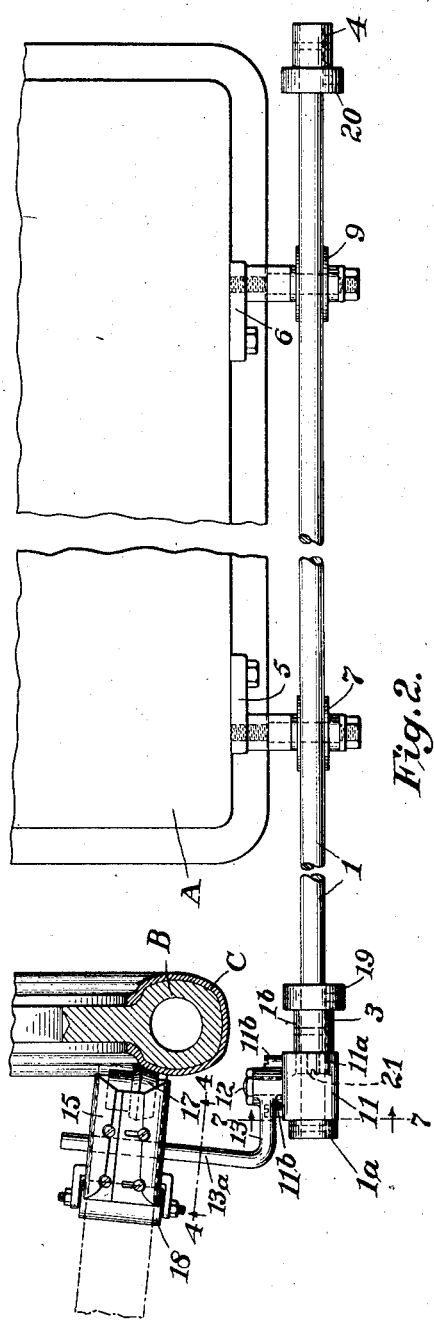
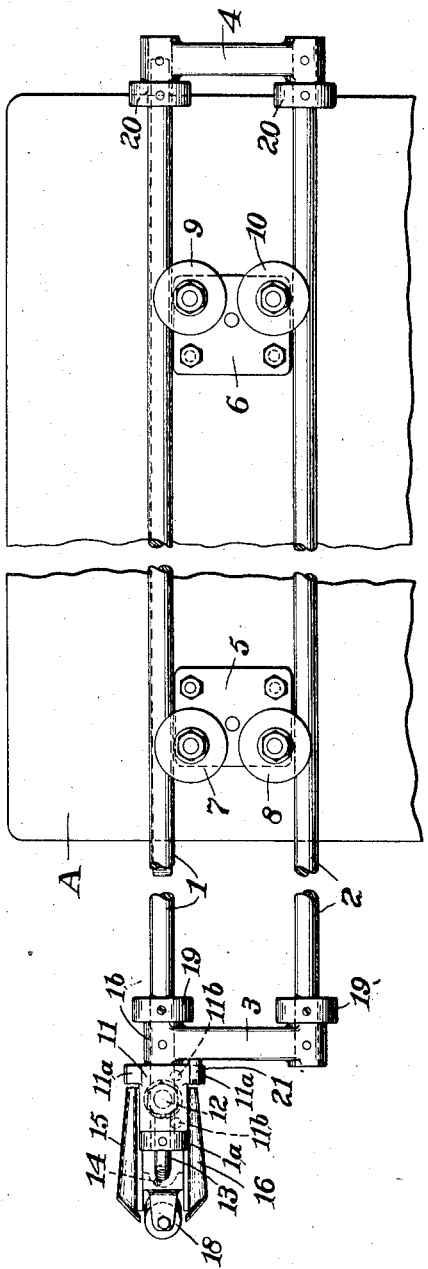
Inventor:
Charles W. Steele,
by Spear, Middleton Donaldson Hall
Attys.

June 14, 1927.

C. W. STEELE 1,632,151

STRIP APPLYING ATTACHMENT FOR TIRE BUILDING MACHINES

Filed Sept. 14, 1926          2 Sheets-Sheet 2

Inventor:
Charles W. Steele,
by Spear, Middleton Donaldson, Hall
Attys.

Patented June 14, 1927.

1,632,151

UNITED STATES PATENT OFFICE.

CHARLES W. STEELE, OF AKRON, OHIO, ASSIGNOR TO THE MILLER RUBBER COMPANY, OF AKRON, OHIO, A CORPORATION OF OHIO.

STRIP-APPLYING ATTACHMENT FOR TIRE-BUILDING MACHINES.

Application filed September 14, 1926. Serial No. 135,325.

My present invention relates to improvements in tire building machines and more particularly to means to be embodied in or attached to such machines for applying side or chafing strips to the tire carcass in the process of building the tires.

The invention aims to provide an exceedingly simple and economical form of means or attachment which can be readily applied to or embodied in existing forms of tire building machines and which will enable the chafing strips to be rapidly guided and applied to the sides of the tire carcass.

The said invention includes the novel construction hereinafter described and defined by the appended claims.

An embodiment of my invention is illustrated in the accompanying drawings in which:—

Figure 1 is a plan view showing a portion of the frame and core with carcass thereon (conventionally) of a tire building machine with my attachment applied thereto.

Fig. 2 is a front elevation with the core omitted for convenience of illustration.

Figure 3:
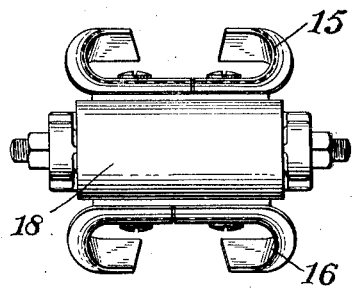
Fig. 3 is a detail elevation of the strip guide as viewed from the left of Figs. 1 and 4.
Figure 4:
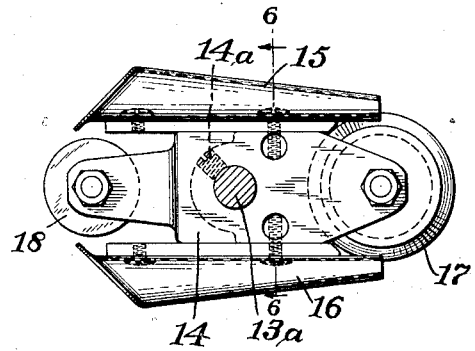
Fig. 4 is a section on line 4—4 of Fig. 1 but showing the strip guide in elevation.
Figure 7:
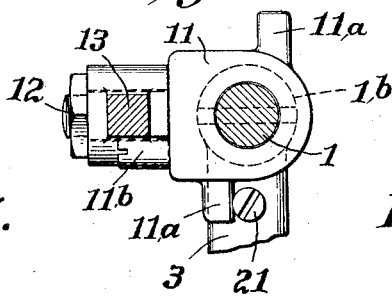
Fig. 7 is a detailed section on line 7—7 of Fig. 1 as indicated by the arrows.
Figure 5:
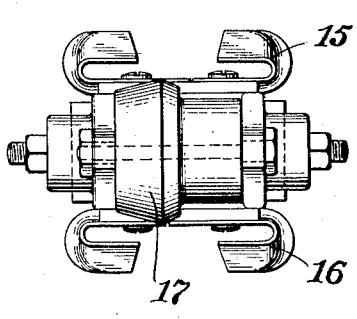
Fig. 5 is a detailed elevation of the strip guide as viewed from the right, Figs. 1 and 4.

Referring by reference characters to these drawings the letter A indicates a portion of the frame of a tire building machine and B the core designed to be rotatably mounted and driven by the usual means while the fabric constituting the tire carcass C is applied thereto by instrumentalities and in the manner well known to those skilled in the art and not described or illustrated herein as unnecessary for an understanding of the present invention.

My attachment comprises a carriage or frame mounted to move in a rectilinear path perpendicular to the plane of the core and intersecting such plane outside the periphery of the core, and such carriage preferably comprises a pair of parallel rods 1 and 2 rigidly connected by cross pieces 3, 4, pinned or otherwise secured to the rods so as to hold the latter against rotary movement. Secured to the frame A of the machine are a pair of brackets 5 and 6 on which are mounted two pairs of grooved wheels 7, 8, and 9, 10 respectively, the grooves of which correspond in shape to the rods 1 and 2, the upper rod 1 traveling in and being supported by the wheels or pulleys 7 and 9 while the lower rod is guided and positioned by the grooves of the pulleys 8 and 10.

Rod 1 is extended beyond the cross or connecting member 3 and has articulated to said extended end a bracket 11, having lugs 11$^a$, said bracket being held against longitudinal movement on the rod by collars 1$^a$ and 1$^b$ pinned thereon.

The bracket 11 carries a stud 12 on which is articulated an angular or bent arm 13, the portion of which adjacent the stud 12 is designed to abut against either one of two studs 11$^b$ disposed on opposite sides of the stud 12 so as to permit a movement of the bent arm 13 through an arc of 180° but limit its movement in either direction, the arm at such limits lying in a horizontal plane. The portion 13$^a$ of the arm 13 is extended sufficiently to lie along side the tire.

Mounted on the extended portion 13$^a$ of this bent arm is the strip guiding and applying means which is shown in detail in Figures 3 to 6 inclusive.

This comprises a frame member 14 secured to arm or rod 13 by a set screw 14$^a$ which frame carries guides 15 and 16 for the fabric strips which guides are duplicates of each other.

The frame also carries at one side, midway of the guides, an applying roller 17, and on the opposite side and similarly positioned, a guide roller 18. Both rollers are idle rollers and roller 17 is designed to be rotated by the tire and is shaped to conform thereto as shown in the drawings.

In the use of this device the guide is positioned first as shown in Fig. 1 with the roller 17 in approximate engagement with the tire carcass. A strip of fabric composing the chafing strip is strated through the guide 15 with its end projecting over the roller 17. The opposite end of the strip hangs over the roller 18. The operator then forces the device in contact with the tire carcass which is revolving. The strip of material will be fed through the guide and drawn on to the tire, being rolled in place by the roller 17.

The arm 13 is then swung to its opposite position, the rods 1 and 2 being slid in their respective guides to such a point that the strip guide approaches the tire carcass on the opposite side. In this position the guide 16 will be uppermost and the strip to be applied to the right side of the tire will then be entered through this guide and applied as before.

The rods 1 and 2 are provided with stop collars 19 and 20 which may be locked thereto by set screws not shown. These are for the purpose of limiting the motion of the rods 1 and 2 so that the strip guide cannot be moved farther away from the carcass in a horizontal direction than just out of contact with the tire carcass.

It will be understood that in moving the strip guide from the left side of the tire, as shown in Fig. 1 to a position on the right side of the tire, the block 11 may be rotated around rod 1 a sufficient distance to allow the arm 13, carrying the strip guide, to pass the carcass to the other side of the tire, and when the arm 13 is moved to the horizontal position as shown, one of the lugs 11ª on the block 11 will engage the stop pin 21 and prevent the strip guide from falling below the horizontal plane of the axis of the tire.

In this connection it will be noted that the stop pin 21 is rigidly mounted on part 3, and the two lugs 11ª on part 11 are so located that in one position of the part 11, one of the lugs 11ª contacts with this pin 21 and holds the arm 13 in a horizontal plane, whereas when the other lug contacts with the pin, arm 13 extends somewhat back of the vertical position and out of the way of the tire, so that the tire may be removed from the machine or other operations performed thereon.

Figure 6:
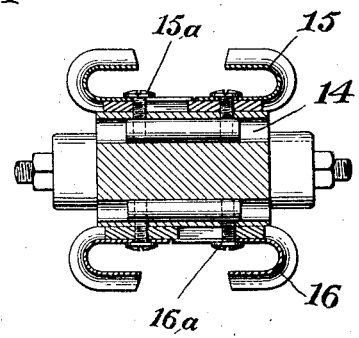
Fig. 6 is a detailed section on line 6—6 of Fig. 4 viewed in direction of the arrows.

The guides 15 and 16 are made adjustable to accommodate strips of different widths by means of the set screws 15ª and 16ᵇ passing through slots in the two part guide members as shown clearly in Fig. 6.

I claim:

1. The combination with a rotatable tire core, of a carriage mounted for rectilinear movement in a plane perpendicular to the plane of the core, a bracket pivotally supported by said carriage to swing about an axis parallel to the axis of the core, an arm pivotally connected to said bracket to swing about an axis perpendicular to the axis of the bracket said arm having an angularly bent portion, a pair of strip guides supported from said bent portion, and a presser roller cooperating with both said strip guides.

2. The combination with a rotatable tire core, of a carriage mounted for rectilinear movement in a plane perpendicular to the plane of the core, a bracket pivotally supported by said carriage to swing about an axis parallel to the axis of the core, an arm pivotally connected to said bracket to swing about an axis perpendicular to the axis of the bracket said arm having an angularly bent portion, a pair of strip guides supported from said bent portion, and a feed and a presser roller cooperating with both said strip guides.

3. In combination with a rotatable tire building core, a carriage mounted to move in a rectilinear path perpendicular to the plane of the core, a substantially L shaped member having the end of its base arm pivotally supported by said carriage to swing about an axis parallel to the plane of the core, equidistant stops for limiting the movement of said base arm, a bracket carried by the other arm, a pair of strip guides carried by opposite faces of said bracket, and an applying roller carried by said bracket equidistant from the exit ends of said strip guides.

4. In combination with a rotatable tire building core, a carriage mounted to move in a rectilinear path perpendicular to the plane of the core, a substantially L shaped member having the end of its base arm pivotally supported by said carriage to swing about an axis parallel to the plane of the core, equidistant stops for limiting the movement of said base arm, a bracket carried by the other arm of said L shaped member, an applying roller rotatably supported at the end of said bracket, and a pair of oppositely placed strip guides carried by the opposite sides of said bracket and having exit ends juxtaposed to the periphery of said applying roller.

5. In combination with a rotatable tire building core, a carriage mounted to move in a rectilinear path perpendicular to the plane of the core, a substantially L shaped member having the end of its base arm pivotally supported by said carriage to swing about an axis parallel to the plane of the core, equidistant stops for limiting the movement of said base arm, a bracket carried by the other arm of said L shaped member, an applying roller rotatably supported at the end of said bracket, a guide roller rotatably supported at the other end of said bracket, and a pair of oppositely placed strip guides disposed on opposite sides of said bracket and having ends disposed respectively adjacent said guide and applying rollers.

6. In combination with a tire building core, a carriage mounted to move in a rectilinear path perpendicular to the plane of the core and having a rod extension, a bracket rotatably mounted on said rod extension, a stud carried by said bracket, a substantially L shaped member having a base arm provided with an eye pivotally engaging said stud, stops on said bracket on opposite sides of said base arm for limiting the movement of said base arm, and strip guiding and applying means carried by the other arm of said L shaped member.

7. The combination with the frame and rotatable core of a tire building machine, of a plurality of pairs of spaced rollers journaled on said frame, a carriage comprising rods slidably engaging said rollers and cross members rigidly connecting said rods, one of the rods being extended beyond the cross member, a bracket rotatably mounted on said extended end adjacent the periphery of the core, a substantially L shaped member having its base arm pivotally supported from said extended end to rotate about an axis perpendicular to said extended rod, a pair of oppositely placed strip guides supported from the other arm of said L shaped member, and an applying roller supported from said other arm and cooperating with both said strip guides.

In testimony whereof I affix my signature.

CHARLES W. STEELE.